G. S. ROUDEBUSH.
Stalk-Cutter.
No. 30,645.
Patented Nov. 13, 1860.
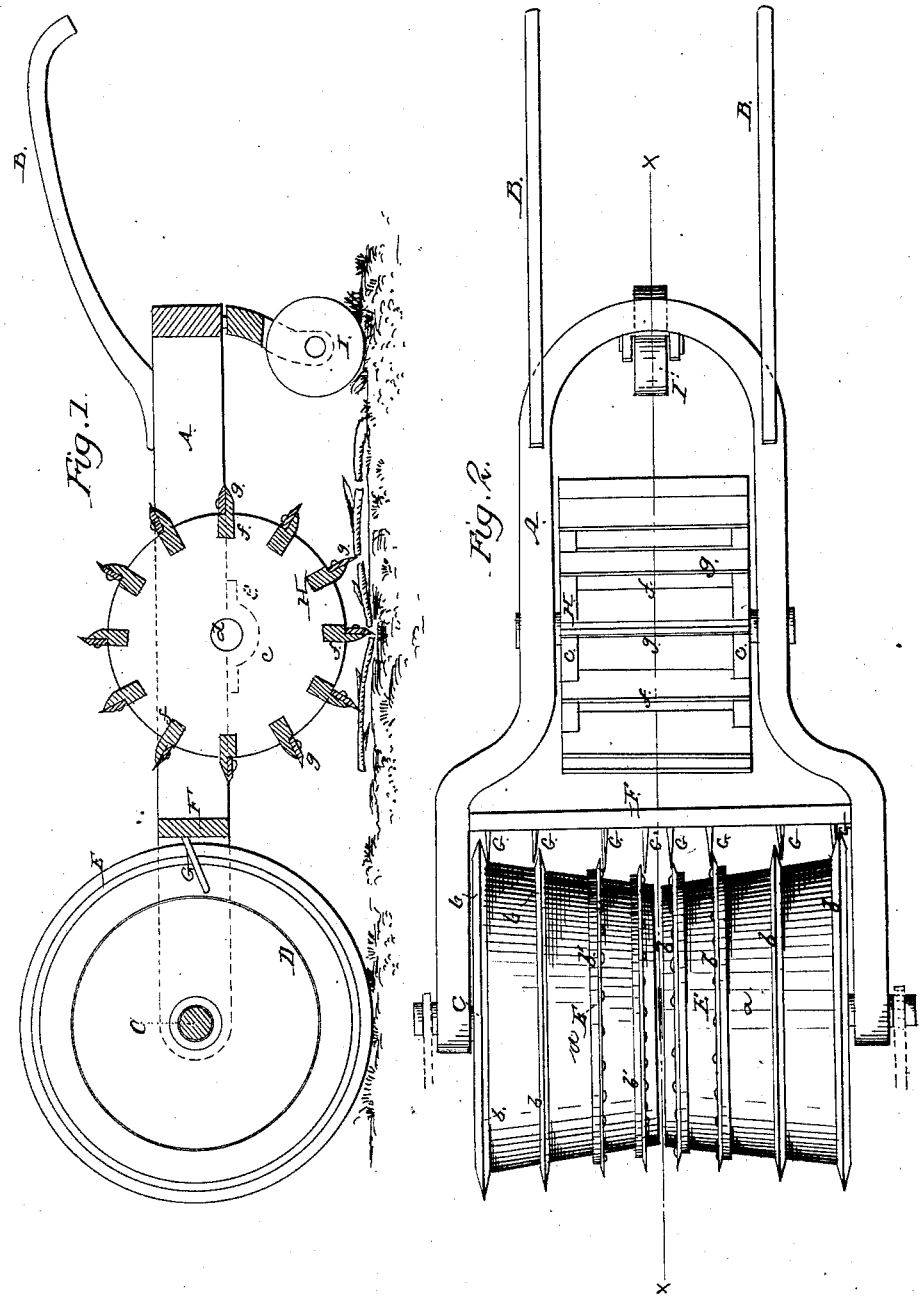

UNITED STATES PATENT OFFICE.

GEORGE S. ROUDEBUSH, OF NATCHEZ, MISSISSIPPI.

IMPROVEMENT IN COTTON AND CORN STALK CUTTERS.

Specification forming part of Letters Patent No. 30,645, dated November 13, 1860.

*To all whom it may concern:*

Be it known that I, GEORGE S. ROUDEBUSH, of Natchez, in the county of Adams and State of Mississippi, have invented a new and Improved Machine for Cutting Standing Cotton and Corn Stalks; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of same.

Similar letters of reference indicate corresponding parts in the several figures.

This invention is designed for cutting into pieces standing cotton and corn stalks, so that the same may be plowed under the surface of the ground and the latter rendered suitable for cultivation at a very moderate expense, the hitherto-tedious hand-labor being avoided, and the work done much more thoroughly.

The invention consists in the employment or use of a biconical roller, provided with flanges and cutters, and used in connection with stationary scrappers and a rotating cutting-cylinder, all the parts being placed in a suitable frame and arranged for joint operation, as hereinafter shown, to effect the desired end.

To make those skilled in the art to fully understand and construct my invention, I will proceed to describe it.

A represents a frame, the back part of which is provided with handles B B. The front part of the frame has a shaft, C, fitted transversely in it, and on this shaft a biconical roller, D, is placed loosely. This roller D is formed of two equal parts, $a\ a$, frustums of cones, the smaller diameters of which adjoin each other. (See Fig. 2.)

Each part $a$ of the roller is provided with four circumferential flanges, $b\ b\ b'\ b'$. The flanges $b$ are at the outer parts of the roller, and the flanges $b'$ at the inner part. The latter flanges have knives E bolted to them, said knives extending entirely around the flanges $b'$. The flanges $b$ are designed to support the front part of the frame when the machine is running or passing over solid ground on roads in being drawn from place to place.

In the frame A, just back of the roller D, there is secured a traverse-bar, F, to which teeth or bars G are secured at right angles. These teeth or bars G extend forward by the sides of the flanges $b$ and knives E, as shown clearly in Fig. 2. In the frame A, just behind the bar F, there is a cylinder, H. This cylinder is formed of two heads, $c\ c$, placed on a shaft, $d$, said shaft being fitted in bearings $e$ at the under side of the frame. The heads $c\ c$ are connected at their peripheries by slats $f$, which are placed at equal distances apart, and are grooved at one side to receive knives $g$, which are bolted to the slats. The back part of the frame A is supported by a caster-wheel, I, when the machine is being drawn from place to place.

The operation is as follows: The draft-thills are attached to the ends of the shaft C. As the machine is drawn along the knives E trim the limbs or cut them from the main portion of the stalks, and the roller D bends over the stalks. The knives $g$ cut the stalk into pieces the length of which correspond of course to the spaces between said knives.

All the parts with the exception of the handles may be constructed of metal.

The biconical form of the roller admits of it conforming to the ridges in which the plants are grown. The bars G serve as scrapers to keep the knives E and flanges $b$ clean. The roller D is made of two parts to facilitate the turning of the machine.

Having thus described my invention, what I claim as new, and desire to secure by Letters Patent, is—

The biconical roller D, provided with the knives E, in connection with the knife-cylinder H, and with or without the bars or scrapers G, all being placed in the frame A, essentially as and for the purpose set forth.

GEO. S. ROUDEBUSH.

Witnesses:
 Jo. D. SHIELDS,
 ALM. LISWELL.